(12) United States Patent
Sibre

(10) Patent No.: US 7,344,207 B2
(45) Date of Patent: *Mar. 18, 2008

(54) APPARATUS FOR PREVENTING UNTIMELY BRAKING IN A BRAKE HAVING ELECTROMECHANICAL ACTUATORS

(75) Inventor: Jérôme Sibre, Paris (FR)

(73) Assignee: Messier-Bugatti, Velizy Villacoublay (FR)

( * ) Notice: Subject to any disclaimer, the term of this patent is extended or adjusted under 35 U.S.C. 154(b) by 253 days.

This patent is subject to a terminal disclaimer.

(21) Appl. No.: 11/118,402

(22) Filed: May 2, 2005

(65) Prior Publication Data

US 2006/0152073 A1    Jul. 13, 2006

(30) Foreign Application Priority Data

Jan. 14, 2005    (FR) .................................. 05 00392

(51) Int. Cl.
*B60T 8/78* (2006.01)
(52) U.S. Cl. ........................................ 303/199; 303/20
(58) Field of Classification Search ................. 303/20, 303/126, 199, 89; 188/264, 156, 158, 161
See application file for complete search history.

(56) References Cited

U.S. PATENT DOCUMENTS 7,213,891 B2 *    5/2007    Sibre ........................... 303/20

2004/0239173 A1    12/2004    Williams et al.
2005/0012385 A1 *    1/2005    Sibre ........................... 303/20

FOREIGN PATENT DOCUMENTS

| DE | 4129502 A1 * | 3/1993 |
|---|---|---|
| FR | 764172 A | 5/1934 |
| FR | 2608975 A | 7/1988 |
| FR | 2790730 A | 9/2000 |
| FR | 2857642 A | 1/2005 |
| GB | 2332931 A | 7/1999 |

* cited by examiner

Primary Examiner—Thomas Williams
(74) Attorney, Agent, or Firm—Sughrue Mion, PLLC

(57) ABSTRACT

An apparatus for preventing untimely braking, which apparatus is specially adapted to an electromechanical brake including at least one actuator having a pusher suitable for being moved by an electric motor controlled by a control module so as to press a stack of disks in controlled manner, The apparatus is provided with a power switch disposed on a power line for powering the electric motor of the actuator, the power switch being controlled by a control logic circuit that places the power switch by default in an open state, and that places the power switch in a closed state only in response to a braking confirmation signal not coming from the control module of the actuator and independent therefrom.

7 Claims, 2 Drawing Sheets

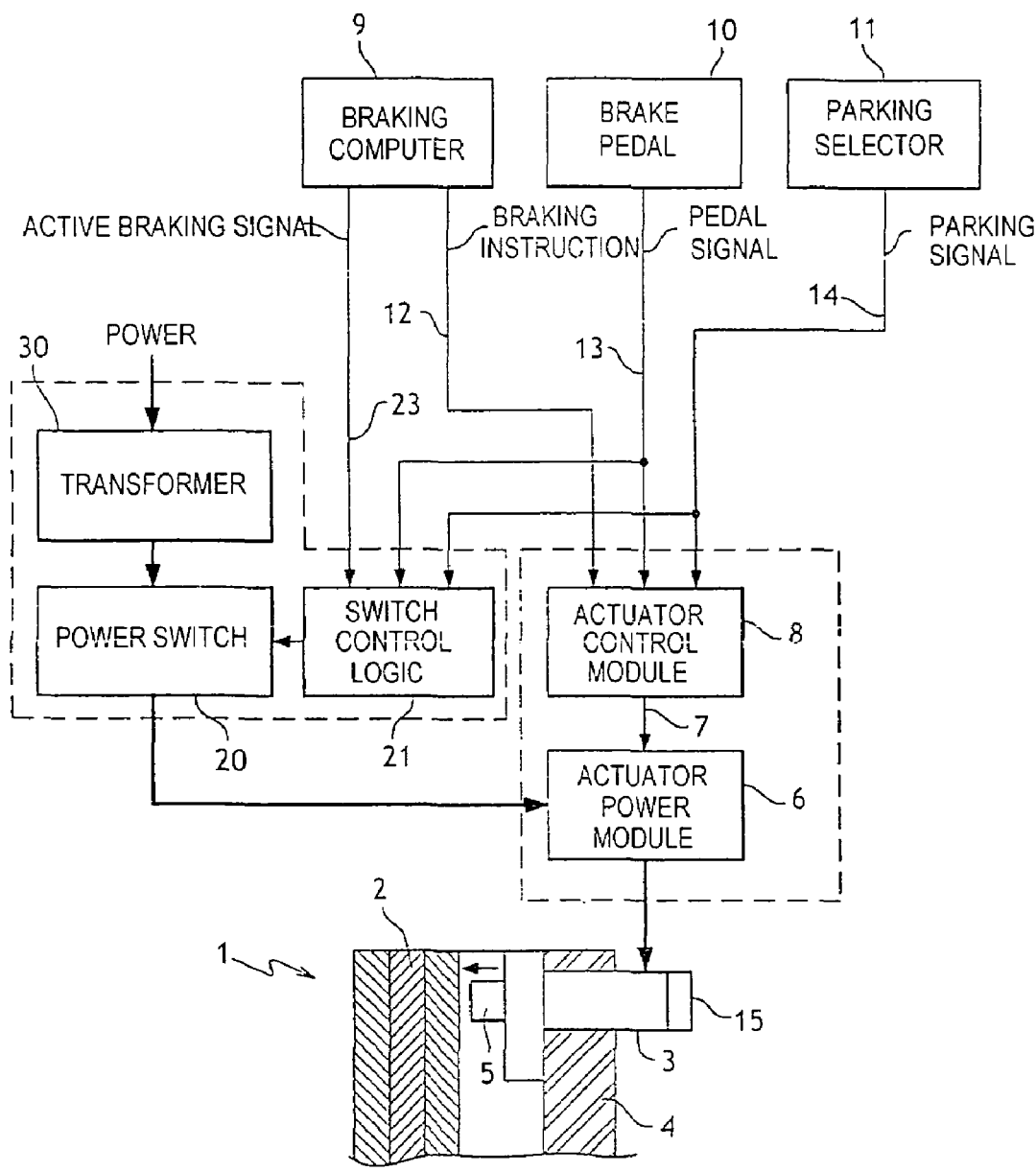

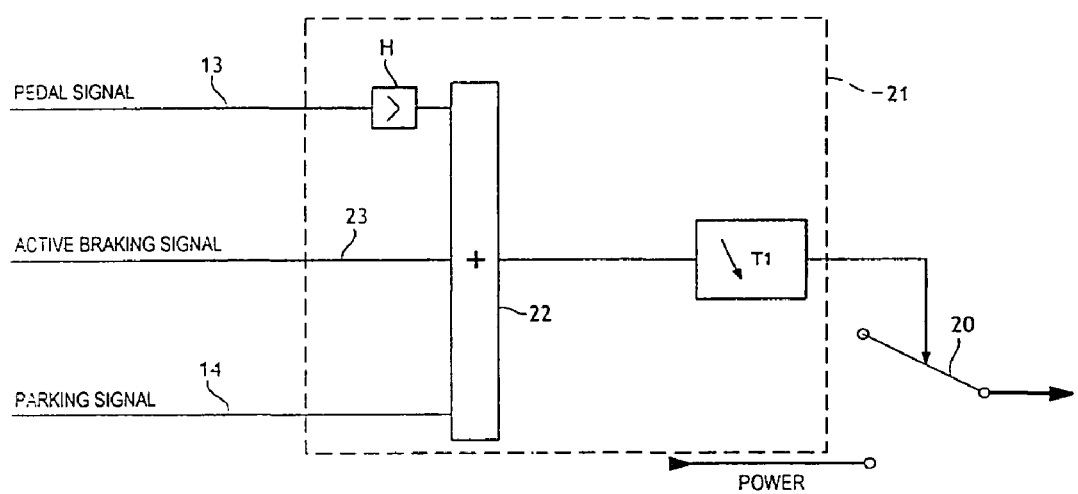

APPARATUS FOR PREVENTING UNTIMELY BRAKING IN A BRAKE HAVING ELECTROMECHANICAL ACTUATORS

The present invention relates to apparatus for preventing untimely braking in a brake having electromechanical actuators.

BACKGROUND OF THE INVENTION

Such a brake comprises a stack of disks and one or more electromechanical actuators disposed facing the stack of disks, each of said actuators comprising a pusher for pushing the stack of disks. The pusher is actuated by an electric motor controlled by a control module of the actuator, which module acts in response to a braking instruction generated by a braking computer by sending a power modulation order to a power stage or module that delivers the required power to the motor of the actuator.

If the braking computer or the control module of the actuator fail, the pusher might be caused to press the disks in untimely manner, which can be dangerous for the safety of the vehicle.

OBJECT OF THE INVENTION

An object of the invention is to provide improved protection from untimely operation of the pusher of an electromechanical brake.

BRIEF DESCRIPTION OF THE INVENTION

With a view to achieving this object, the invention provides apparatus for preventing untimely braking, which apparatus is specially adapted to an electromechanical brake including at least one actuator having a pusher suitable for being moved by means of an electric motor controlled by a control module so as to press a stack of disks in controlled manner. According to the invention, the apparatus is provided with a power switch disposed on a power line for powering the electric motor of the actuator, the power switch being controlled by a control logic circuit that places the power switch by default in an open state, and that places the power switch in a closed state only in response to a braking confirmation signal not coming from the control module of the actuator and independent therefrom.

Thus, in the event that the control module of the actuator fails, the actuator cannot apply force in untimely manner to the stack of disks, because it is deprived of power by the switch.

It would take a double failure (failure of the control module and failure of the member that sent the confirmation signal) in order for untimely braking to take place, which is highly improbable.

BRIEF DESCRIPTION OF THE DRAWINGS

The invention will be better understood on reading the following description given with reference to the accompanying drawings, in which:

FIG. 1 is a block diagram of an aircraft brake circuit equipped with apparatus for preventing untimely braking, which apparatus has a power switch of the invention;

FIG. 2 is a diagram of the logic circuit for controlling the power switch.

DETAILED DESCRIPTION OF THE INVENTION

With reference to FIG. 1, and in a manner known per se, an electromechanical brake 1 for an aircraft comprises a stack of disks 2 made up, in alternation, of disks constrained to rotate with the wheel to be braked, and of disks that are prevented from rotating.

The brake 1 further comprises a plurality of actuators 3 (only one of which is shown) which are carried by a ring 4 so as to extend facing the stack of disks 2. Each actuator 3 comprises a pusher 5 suitable for being moved towards the stack of disks 2 so as to press said stack, and thus generate a braking force.

The pusher 5 is moved by an electric motor via a mechanism transforming a rotary movement of the electric motor into a linear movement of the pusher 5.

The electric motor is fed via a power module of the actuator 6 which delivers electrical power to the motor as a function of an order 7 delivered by the control module of the actuator 8.

The orders delivered by the control module of the actuator 8 are generated on the basis of various signals, coming in particular from a braking computer 9, from a brake pedal 10, and from a parking selector 11.

In this example, the entire brake system of the aircraft is designed to operate in three modes: a normal mode, an emergency mode, and a parking mode.

In the normal mode, the control module of the actuator 8 generates an order 7 as a function of a braking setpoint instruction 12 received from the braking computer 9.

In the emergency mode, in which the braking computer 9 has failed, the control module of the actuator 8 generates an order 7 as a function of a pedal signal 13 representative of the extent to which the brake pedal 10 is depressed when actuated directly by the pilot.

In the parking mode, which takes priority over the other two modes, the control module of the actuator 8 generates a parking braking order 7 in response to a parking signal 14 transmitted when the parking selector 11 is actuated by the pilot. In order to enable the parking braking to be maintained when the aircraft is at a standstill, the actuator 3 is equipped with a failsafe brake 15 which, when it is not fed with current, locks the pusher 5 in position, by locking one of the transmission shafts of the mechanism between the electric motor and the pusher 5.

It then suffices to ensure that the failsafe brake 15 is powered, to cause the pusher 5 to move so that it exerts a parking force on the stack of disks, and then to switch off the power supply to the failsafe brake 15 in order to lock the actuator in the parking braking position.

The use of a failsafe brake as a locking member is particularly suitable because it makes it possible to keep the parking force applied without any power consumption.

In the invention, the apparatus comprises a power switch 20 disposed on the power line, and, in this example, upstream from the power module of the actuator 6. The power switch 20 is controlled by a logic circuit for controlling the switch 21, which circuit places the switch 20 by default in an open state in which the power module of the actuator 6 is not powered. In this state, the pusher 5 of the actuator 3 cannot move in response to an order from the control module of the actuator 8.

The control logic circuit of the switch 21 is arranged to place the switch 20 in a closed state only in response to a braking confirmation signal that does not come from the control module of the actuator 8 and that is independent thereof.

The braking confirmation signal can be of various origins, as is explained below with reference to FIG. 2.

In normal mode, the confirmation signal is an active braking signal 23 which is transmitted by the braking computer 9, and which indicates that the braking computer is transmitting a braking instruction that requires the pusher 5 to be moved. Said active braking signal 23 can merely be the braking instruction 12 itself, or else be generated on the basis of the braking instruction.

In emergency mode, the computer 9 is inactive so that the active braking signal 23 is absent. The confirmation signal is then the pedal signal 13. A comparator H makes it possible to take account of said signal only if it exceeds a determined threshold, thereby avoiding switching the power switch unnecessarily for low braking requests.

In the parking mode, the confirmation signal is the parking signal 14.

All of the signals 13, 14, 23 are processed by an OR gate referenced 22. The output of the OR gate 22 causes the power switch 20 to be switched from the open state to the closed state, making it possible for the actuator 3 to be powered via the power module of the actuator 6.

The logic circuit includes a time delay T1 placed at the outlet of the OR gate 22 and activated only on a falling edge. When that one of the confirmation signals that was active becomes zero, the output of the OR gate 22 also becomes zero, which, in the absence of the time delay T1, would cause the power switch 20 to be switched immediately to the open state. The time delay T1 makes it possible to allow the control module of the actuator 8 enough time to cause the pusher 5 to return to its rest position before the power is interrupted by the power switch 20.

Preferably, the power switch 20 and its control logic circuit 21 are physically separated from the control module 8 so as to avoid a failure affecting the control module 8 reaching the power switch 20. To this end, the power switch 20 can, for example, be integrated with a transformer 30 adapted to convert the electrical power delivered by the alternators of the aircraft into electrical power usable by the electric motors of the actuators 3.

As indicated by the dashed lines in FIG. 1, in this example, the power switch 20, the control logic circuit 21 and the transformer 30 form a first unit in this example while the control module of the actuator 8 and the power module 6 form a second unit separate from the first unit.

The invention is not limited to what is described above, but rather it encompasses any variant lying within the ambit defined by the claims.

In particular, although the power switch is shown as being placed on the power line upstream from the power module, said switch could be placed downstream from the power module.

What is claimed is:

1. Apparatus for preventing untimely braking, which apparatus is specially adapted to an electromechanical brake including at least one actuator having a pusher suitable for being moved by an electric motor controlled by a control module so as to press a stack of disks in controlled manner, wherein the apparatus is provided with a power switch disposed on a power line for powering the electric motor of the actuator, the power switch being controlled by a control logic circuit that places the power switch by default in an open state, and that places the power switch in a closed state only in response to a braking confirmation signal not coming from the control module of the actuator and independent therefrom.

2. Apparatus according to claim 1, wherein the power switch and its control logic are physically separated from the control module of the actuator.

3. Apparatus according to claim 2, wherein the power switch and its control logic circuit are integrated into equipment that is distinct from equipment integrating the control module.

4. Apparatus according to claim 3, wherein the braking confirmation signal is an active braking signal coming from a braking computer that also delivers a braking instruction to the control module of the actuator.

5. Apparatus according to claim 1, wherein the braking confirmation signal is a pedal signal coming from a brake pedal.

6. Apparatus according to claim 1, wherein the braking confirmation signal is a parking signal coming from a parking selector.

7. Apparatus according to claim 1, wherein the control logic circuit includes a time delay so that, when the confirmation signal is no longer present the control logic circuit delays the return of the power switch to the open state.

* * * * *